Nov. 8, 1960

J. CONNORS ET AL 2,958,950

MICROHEIGHT GAGES

Filed Oct. 24, 1956

INVENTORS
John Connors
Thomas H. Savignon
BY
Rockwell N. Saxtleton
ATTORNEYS

Nov. 8, 1960 J. CONNORS ET AL 2,958,950
MICROHEIGHT GAGES
Filed Oct. 24, 1956 2 Sheets-Sheet 2
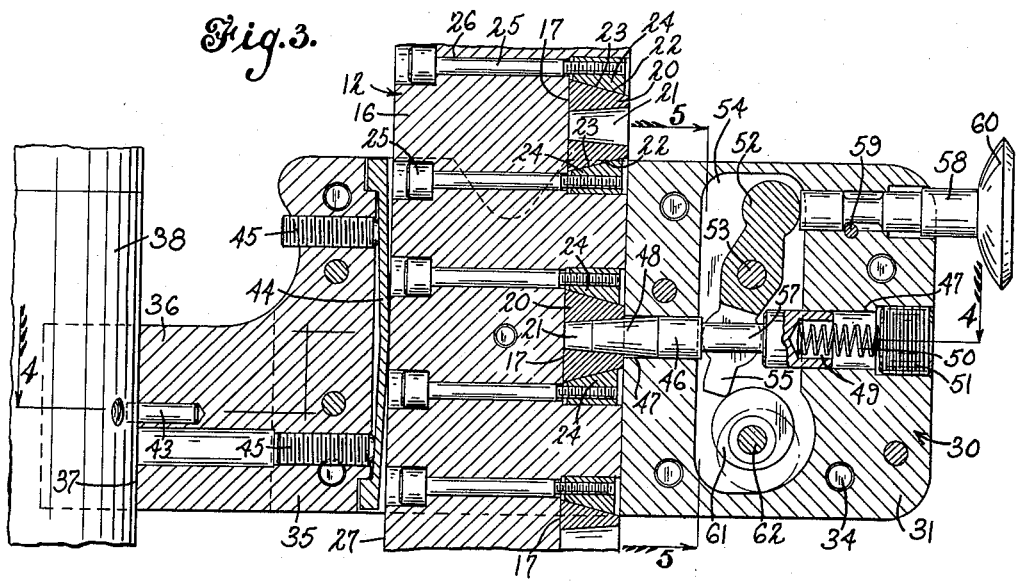
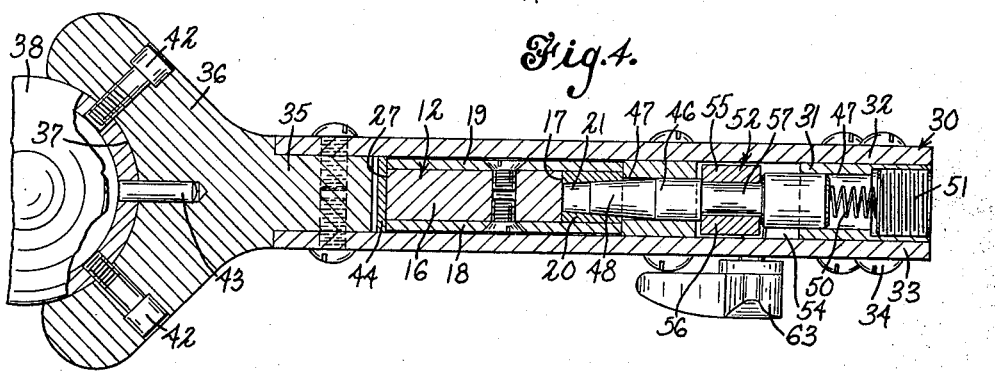
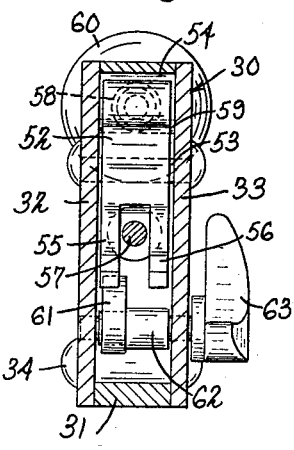
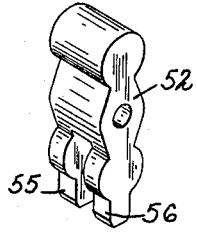
INVENTORS
John Connors
and Thomas H. Sarignan
BY
Rockwell Beuchotons
ATTORNEYS

United States Patent Office

2,958,950
Patented Nov. 8, 1960

---

2,958,950

MICROHEIGHT GAGES

John Connors, Orange, and Thomas N. Carignan, East Haven, Conn., assignors to The Greist Manufacturing Company, New Haven, Conn., a corporation of Connecticut Filed Oct. 24, 1956, Ser. No. 618,141

7 Claims. (Cl. 33—169)

This invention relates to a height gage mechanism and more particularly to a device for supporting a height gage above a support or surface in a manner in which the gage may be adjusted vertically with respect to the supporting surface and its distance therefrom accurately indicated.

In measuring the height of an object by a height gage, the object is sometimes of greater dimension than could be accommodated by the gage if the latter were placed directly upon the surface upon which the object itself was supported. It is, therefore, necessary to support the gage itself by other means so that it may be adjusted vertically with respect to the surface. It is, of course, necessary under such circumstances that the gage be set at positions which may be accurately measured or accurately indicated by the mechanism so that the height of the object may be accurately determined.

It is contemplated by the present invention to provide a gage-supporting mechanism consisting generally of a vertical column having an adjustable slider mounted thereon. Means is provided for supporting the slider in certain selected positions along the column, which positions are accurately determined so that the gage will always be supported at accurately determined distances from the supporting surface, and the measurements which are read from the gage itself may be added to those indicated by the position of the slider in order to ascertain the exact reading for the height of the object.

It is also contemplated to provide means for making fine adjustments of the various positions at which the slider is held on the column so that compensation may be made for any inaccuracies of manufacture which will, of course, reduce the expense of manufacture in that greater tolerances may be permitted in the manufacturing process than would otherwise be the case. Also the slider is so constructed that it may be readily manipulated to any selected position of adjustment and may be locked in such position to prevent removal therefrom until such locking means is released.

One object of the present invention is to provide a new and improved height gage mechanism.

Still another object of the invention is to provide improved means for supporting a height gage from a supporting surface so constructed that the gage mechanism may be readily and accurately adjusted to any selected position above the supporting surface.

Still another object of the invention is to provide a gage-supporting mechanism consisting of a column and a gage-supporting slider movable along said column and releasably securable to the column in any one of a number of given selected positions, which positions may be accurately determined.

Still another object of the invention is to provide a gage mechanism of the character described above wherein the means for holding the slider in selected positions may be adjusted relatively to the column to compensate for any inaccuracies present in the manufacture of the device.

To these and other ends the invention consists in the novel features and combinations of parts to be hereinafter described and claimed.

In the accompanying drawings:

Fig. 3 is a sectional view on line 3—3 of Fig. 2;

Fig. 4 is a sectional view on line 4—4 of Fig. 3;

Fig. 5 is a sectional view on line 5—5 of Fig. 3; and

Fig. 6 is a perspective view of the lever for operating the push pin reciprocably mounted in the slider.

Figure 1:
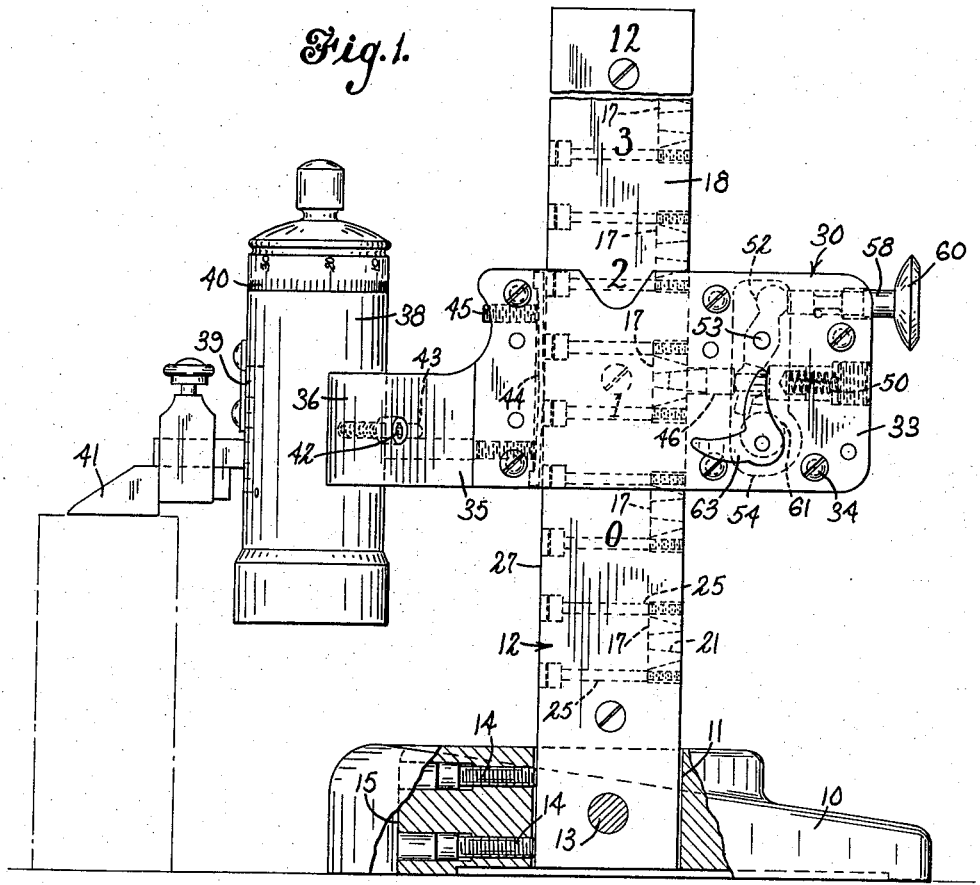
Fig. 1 is a side elevational view of a gage mechanism embodying the invention, some parts being broken away.
Figure 2:
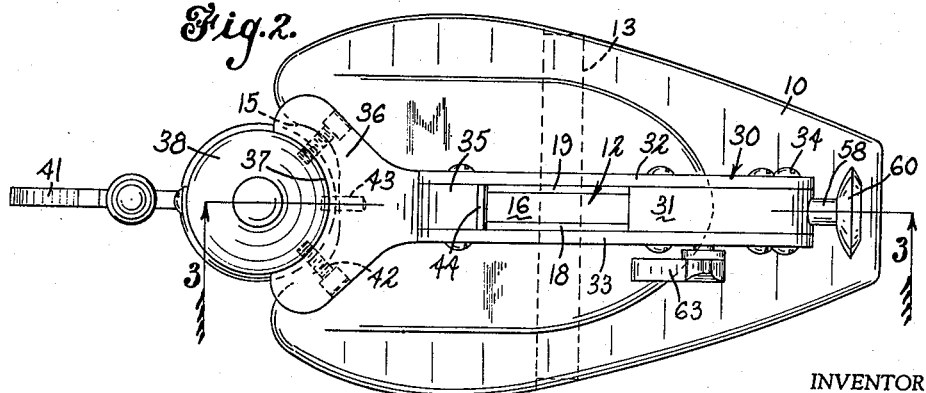
Fig. 2 is a top plan view thereof.

To illustrate one embodiment of the invention, there is shown in the drawings a gage mechanism comprising a base 10 having a recess 11 therein adapted to receive the lower end of a substantially vertically extending column designated by the numeral 12 which is pivoted to the base by the pivot pin 13. The column may be adjusted about the pivot pin 13 in order that it stand in an erect or vertical position with respect to the base by adjusting screws 14 which, as shown in Fig. 1, are threaded into the base and bear at their inner ends against the front face of the column 12. One of these screws is positioned above and one below the pivot pin 13 so that by backing off one of the screws and setting the other up toward the column, the latter may be adjusted pivotally about the pin 13. As shown at 15 in Fig. 2, the base is recessed at its forward face and the screws 14 are inserted through bores opening into said recess.

The column 12 comprises a central bar 16 (Figs. 3 and 4) having a plurality of recesses 17 cut in its rear edge, these recesses extending from one side of the column to the other for ease of manufacture. Plates 18 and 19 are secured upon each side face of the column, as shown in Fig. 4, these plates closing the sides of the recesses 17.

As shown more especially in Figs. 1 and 3, a socket member 20 having a tapered socket 21 therein is mounted in each of the recesses 17. Each of these members has upper and lower beveled faces 22 against which bear the beveled faces 23 of wedge members 24, one positioned above and one below each of the socket members 20 in the recesses 17.

Screws 25 are inserted in an opening 26 through the forward face 27 of the bar 16, each of these screws being threaded at their inner ends into one of the wedge members 24. With this construction it will be seen that by rotating the screws, the wedge members may be adjusted toward and from the face of the bar and thus effect vertical adjustments of the socket members 20. For example, if, as shown in Fig. 3, the upper wedge 24 adjacent one of the socket members 20 is moved toward the right, it will permit the socket member to be adjusted upwardly in the recess. Movement of the lower wedge 24 toward the left will then cam the socket member upwardly and cause it to be bound firmly between the two wedge members in any given adjusted position. By this means a very fine adjustment of the socket members in a vertical direction or longitudinally of the column 12 may be effected, thus avoiding the necessity of extreme accuracy in the manufacture of the column and compensating for any inaccuracies in such manufacture.

A slider designated generally by the numeral 30 is slidably mounted upon the column 12, this slider comprising a body portion 31 to the opposite sides of which are secured plates 32 and 33 by screws or rivets 34. The plates 32 and 33 will thus be spaced apart and provide between them a space, forwardly of the body 31, for reception of the column 12.

Forwardly of the column the shank 35 of a yoke 36 is secured between the plates 32 and 33 (Fig. 4), and within a socket 37 of this yoke is secured the height gage 38. This gage is of the usual form and need not be described in detail. As is usual, it will bear indicia 39 and 40 to indicate the height of the slidable measuring finger 41 from the bottom of the gage. It may be secured to the yoke 36 by means of screws 42 and a locating dowel pin 43.

Between the rear face of the shank 35 and the forward face 27 of the column 12 is a gib 44 of resilient material to take up any play between the parts and effect smooth sliding movement of the slider upon the column. This gib may be adjusted by adjusting screws 45 so as to obtain the desired contact of the gib with the face of the column.

As shown more especially in Fig. 3, a plunger 46 is reciprocably mounted in openings 47 in the body 31, this plunger being tapered at its forward end, as shown at 48, to fit snugly into the tapered socket 21 of the socket members 20. At its rear end the plunger is provided with a socket 49 in which is disposed a spring 50 bearing at its outer end against an adjusting screw 51 so that the tension of the spring may be adjusted. This spring normally urges the plunger toward the column so that its tapered end portion will be lodged within one of the sockets 21.

In order to withdraw the plunger from the socket so that the slider may be adjusted on the column, a lever 52 is pivoted between its ends, as shown at 53 in the body 31, this lever being mounted in an opening 54 through the body, which opening is sufficiently large to accommodate swinging movements of the lever. The lower end of the lever is bifurcated so as to provide legs 55 and 56 which straddle a reduced portion 57 of the plunger 46. A push pin 58 is reciprocably mounted in the body 31, the pin being held against removal by a pin 59 engaging an annular reduced portion of the pin 58. The latter is provided with an enlarged head or button 60 by which it may be manipulated.

With the above construction it will be seen that, as the inner end of the push pin 58 bears against the upper end of the lever 52, when the push pin is pushed inwardly, the lower end of the lever will draw the plunger 46 outwardly against the tension of the spring 50 and withdraw the inner end of the plunger from the socket 21 in which it is engaged so that the slider may be adjusted vertically to another position on the column. When the button 60 of the push pin 58 is released, the spring 50 will urge the plunger inwardly and, therefore, urge the push pin outwardly to the position shown in Fig. 3.

It may sometimes be desired to lock the plunger 46 in its position in the socket, as shown in Fig. 3. To this end a disk-like stop member 61 is eccentrically secured to a shaft 62 rotatably mounted between the plates 32 and 33. A thumb piece 63 is secured to this shaft by which it may be rotated. Rotation of the shaft 62 to move the stop member 61 to the position shown in full lines in Figs. 3 and 5 will cause the stop member to engage the leg 55 of the lever 52 and prevent movement of this lever and, therefore, prevent withdrawal of the plunger from its socket. Clockwise rotation of the shaft 62 from the position shown in full lines in Fig. 3 will move the stop member 61 to its dotted-line position, shown in Fig. 3, so that it will no longer engage the leg 55 of the lever 52 and permit withdrawal of the plunger from its socket.

While we have shown and described one embodiment of our invention, it will be understood that it is not to be limited to all of the details shown, but is capable of modification and variation within the spirit of the invention and within the scope of the claims.

What we claim is:

1. Gage mechanism comprising an upright column, means for supporting said column, a slider mounted on the column for slidable adjustment therealong, a spring-pressed plunger mounted in the slider and projecting therefrom toward the column, said column having a recess in the side thereof facing said plunger, a socket member mounted in said recess to receive the plunger, means for adjusting said member in the recess in a direction longitudinally of the column and for securing it in adjusted position, said means comprising a wedge member on each side of said socket member having an inclined face adjacent the latter, the opposite face of each wedge member slidably bearing against the wall of the recess, said socket member having complemental inclined faces corresponding with those of the wedge members and means for adjusting said wedge members transversely of the column.

2. Gage mechanism comprising an upright column, means for supporting said column, a slider mounted on the column for slidable adjustment therealong, a spring-pressed plunger mounted in the slider and projecting therefrom toward the column, said column having a recess in the side thereof facing said plunger, a socket member mounted in said recess to receive the plunger, means for adjusting said member in the recess in a direction longitudinally of the column and for securing it in adjusted position, said means comprising a wedge member on each side of said socket member having an inclined face adjacent the latter, said socket member having complemental inclined faces corresponding with those of the wedge members, and means for adjusting said wedge members, said means being accessible for actuation at the side of the column opposite said recess.

3. Gage mechanism comprising an upright column, means for supporting said column, a slider mounted on the column for slidable adjustment therealong, a spring-pressed plunger mounted in the slider and projecting therefrom toward the column, said column having a recess in the side thereof facing said plunger, a socket member mounted in said recess to receive the plunger, means for adjusting said member in the recess in a direction longitudinally of the column and for securing it in adjusted position, said means comprising a wedge member on each side of said socket member having an inclined face adjacent the latter, said socket member having complemental inclined faces corresponding with those of the wedge members, and adjusting screws threaded into said wedge members and extending through said column to the side thereof opposite said recess to be accessible for actuation.

4. Gage mechanism comprising an upright column, means for supporting said column, a slider mounted on the column for slidable adjustment therealong, a spring-pressed plunger mounted in the slider and projecting therefrom toward the column, said column comprising a central bar having recesses formed in one face thereof, plates secured at each side of said bar to cover the faces of said recesses, and socket members adjustably mounted in said recesses having outwardly facing sockets to receive said plunger.

5. Gage mechanism as in claim 1 wherein a push pin is reciprocably mounted in the slider in spaced relation to the plunger to withdraw the latter from said socket, and a lever is pivoted in the slider between said push pin and plunger and engaging both thereof to transmit motion from the former to the latter.

6. Gage mechanism comprising an upright column, means for supporting said column, a slider mounted on the column for slidable adjustment therealong, a spring-pressed plunger mounted in the slider and projecting therefrom toward the column, said column having a plurality of spaced sockets in one face thereof to receive said plunger, means including a push pin reciprocably mounted in the slider in spaced relation to the plunger to withdraw the latter from said sockets, a lever pivoted in the slider between said push pin and plunger and engaging both thereof to transmit motion from the former to the latter, and a locking device to prevent the withdrawal of the plunger from the sockets, said device comprising a member movable to position to engage said lever and prevent movement thereof.

7. A gage mechanism as in claim 6 wherein said locking device comprises a stop member mounted in the slider for rotation about an axis eccentric to said member and adapted to be rotated to position to engage said lever.

References Cited in the file of this patent

UNITED STATES PATENTS

| | | | |
|---|---|---|---|
| 47,824 | Horton | | May 23, 1865 |
| 296,157 | Gabriel | | Apr. 1, 1884 |
| 302,315 | Bellamy | | July 22, 1884 |
| 761,328 | Spalding | | May 31, 1904 |
| 1,949,280 | Lester | | Feb. 27, 1934 |
| 2,209,250 | Manthey | | July 23, 1940 |
| 2,397,020 | Lee | | Mar. 19, 1946 |
| 2,596,637 | Zalanskas | | May 13, 1952 |
| 2,617,199 | Samotey | | Nov. 11, 1952 |